(12) United States Patent
Gordon et al.

(10) Patent No.: US 11,263,319 B2
(45) Date of Patent: Mar. 1, 2022

(54) SUSPICIOUS CREDENTIAL CHANGE DETECTION AND MITIGATION

(71) Applicant: Microsoft Technology Licensing, LLC, Redmond, WA (US)

(72) Inventors: Ariel Nicolas Gordon, Kirkland, WA (US); Timothy Colin Larson, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 543 days.

(21) Appl. No.: 16/106,437

(22) Filed: Aug. 21, 2018

(65) Prior Publication Data

US 2020/0065484 A1    Feb. 27, 2020

(51) Int. Cl.
*G06F 21/55* (2013.01)
*G06F 21/60* (2013.01)

(52) U.S. Cl.
CPC .......... *G06F 21/554* (2013.01); *G06F 21/604* (2013.01); *G06F 2221/034* (2013.01)

(58) Field of Classification Search
CPC . G06F 21/554; G06F 21/604; G06F 2221/034
See application file for complete search history.

(56) References Cited

U.S. PATENT DOCUMENTS

| | | | |
|---|---|---|---|
| 7,712,137 B2* | 5/2010 | Meier | H04L 63/1433 726/25 |
| 9,225,704 B1* | 12/2015 | Johansson | H04L 63/08 |
| 2016/0044011 A1* | 2/2016 | Gordon | H04L 63/083 726/6 |
| 2016/0085962 A1* | 3/2016 | Sokolov | G06F 21/31 726/6 |
| 2016/0142411 A1* | 5/2016 | Alger | H04W 4/60 709/225 |
| 2017/0161520 A1* | 6/2017 | Lockhart, III | G06F 21/6263 |
| 2017/0324758 A1* | 11/2017 | Hart | H04L 63/1416 |
| 2018/0004870 A1* | 1/2018 | Ohayon | H04L 41/16 |
| 2018/0046796 A1 | 2/2018 | Wright et al. | |
| 2018/0069893 A1* | 3/2018 | Amit | G06F 21/554 |
| 2018/0083986 A1 | 3/2018 | Hurley et al. | |
| 2018/0139221 A1* | 5/2018 | Chen | H04L 63/1425 |
| 2018/0288065 A1* | 10/2018 | Selgas | H04L 63/0884 |
| 2018/0357430 A1* | 12/2018 | Selgas | G06F 21/604 |
| 2018/0375645 A1* | 12/2018 | Hanumantharau | G06F 16/23 |
| 2019/0052615 A1* | 2/2019 | Auvenshine | H04L 63/068 |
| 2020/0028876 A1* | 1/2020 | Cohen | H04L 63/1483 |
| 2020/0057848 A1* | 2/2020 | Hecht | H04L 63/10 |

OTHER PUBLICATIONS

"International Search Report and Written Opinion Issued in PCT Application No. PCT/US2019/039673", dated Sep. 23, 2019, 12 Pages. (MS# 404846-WO-PCT).

* cited by examiner

*Primary Examiner* — Trang T Doan
(74) *Attorney, Agent, or Firm* — Workman Nydegger

(57) ABSTRACT

Suspicious credential changes are automatically detected and mitigated. A comparison of data surrounding user-account credential changes with suspicious change patterns forms a basis for detecting suspicious credential changes. More particularly, if a credential change substantially matches a known suspicious change pattern, the credential change can be flagged as suspicious. After a credential change is determined to be suspicious, one or more mitigation activities can be triggered to allay adverse effects associated with a suspicious credential change.

19 Claims, 10 Drawing Sheets

SUSPICIOUS CREDENTIAL CHANGE DETECTION AND MITIGATION

BACKGROUND

First-line workers are the first point of contact between a company and the outside world. These are people who typically do not sit behind a computer all day but rather work, for example, on a store floor, in a clinic, or on the phone. In this role, such workers are typically first to engage customers and represent a company and its brand. Despite not sitting behind a computer all day, first-line workers may be required to access certain productivity applications. First-line workers, however, are typically non-technical and do not have access to an onsite information technology administrator. In lieu of dedicated information technology administrators, a manager of first-line workers, or other figure of authority, can be given additional credentialing responsibilities. First-line workers contact a store manager, for instance, to acquire credentials such as a user name and password or smart card.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to suspicious credential change detection and mitigation. Data surrounding a credential change on a user account can be collected and automatically compared against a set of suspicious credential change patterns. If the data surrounding the credential change matches one of the set of suspicious credential change patterns, the credential change can be flagged as suspicious. In response to a credential change being flagged as suspicious, one or more mitigation actions can be triggered to allay adverse effects of a suspicious credential change. Mitigation actions can comprise notification, suspension of credential management privileges, and initiating monitoring of credential administrator activities, among others.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

For decades threats associated with credential setting and resetting have been analyzed with respect to information technology administrators. In the case of information technology administrators there is a significant level of vetting that is performed, they are centrally located, and there is oversight. In the context of first-line workers, individuals charged with credential management are non-technical, numerous, and subject to minimal oversight. Consequently, delegating credential management to store managers or other figures of authority reveals new threats. These threats can come from a malicious manager or an attacker who takes control of that manager's credentials.

By way of example, assume Bob is a manager and credential administrator at a retail store, and Alice is an employee. If Bob had malicious intent, Bob could reset and record Alice's user name and password and use these to check her email and login to Alice's shift information. If phone number and text code are used in place of user name and password, Bob could set his own phone number on Alice's account to access her data. Bob could then change the phone number back to Alice's number, in which case Alice may never learn that Bob was temporarily able to access her data.

A conventional solution is to limit the number of people who have the credential role and not give this role to untrusted people. However, such a solution defeats the purpose of a model that empowers figures of authority to perform such actions on behalf of employees.

The subject description pertains to detection and mitigation of suspicious credential changes. Credential changes and data surrounding credential changes can be captured and compared with suspicious credential change patterns. If a match is detected, the credential change can be flagged as suspicious. In response to a detected suspicious credential change, one or more mitigation strategies can be triggered. In a simple response, a suspicious change can be reported to an authority/oversight figure. A credential management role of the user account associated with the change can also be suspended or extensive logging initiated, among other things.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the form disclosed. Rather, the intention is to cover all modifications, equivalents, and alternatives falling within the spirit and scope of the claimed subject matter.

Figure 1:
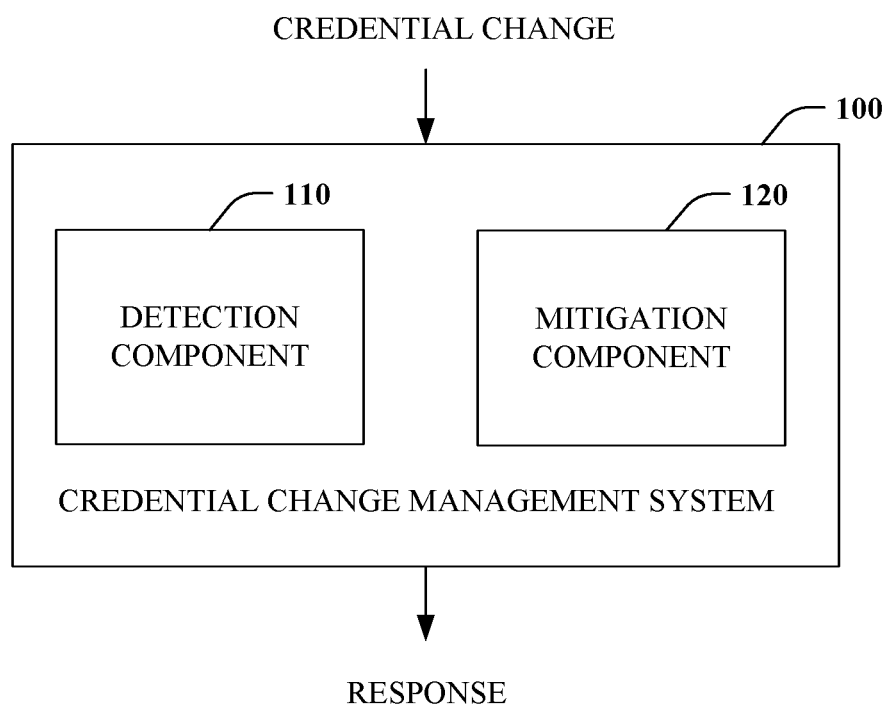
FIG. 1 is a schematic block diagram of a credential change management system.

Referring initially to FIG. 1, a credential change management system 100 is illustrated. A credential is a piece of data used to prove the identity of a user. Generally, a credential can be something a user knows, something a user has, or something a user is. For instance, a credential can correspond to a user name, password, phone number, smart card, hardware token, or fingerprint, among many others. The system 100 receives data surrounding a credential change. For example, a user password or phone number can be changed. This credential change can be made by a credential administrator, or an attacker who takes control of credentials of a credential administrator. A credential administrator is not an information technology administrator, but rather a non-technical figure of authority amongst first-line workers. By way of example, and not limitation, the credential administrator can be a retail store manager with several employees to whom the manager assigns credentials. The system 100 analyzes received data or information surrounding a credential change and outputs a response. The response can be a classification, recommendation, report, or triggered action. Further, the system 100 can operate in substantially real time or offline later (e.g., post event).

The system 100 includes detection component 110 and mitigation component 120. The detection component 110 provides a means for detecting suspicious credential changes. The detection component 110 analyzes credential change information and detects suspicious credential changes based on patterns of known suspicious credential changes. The mitigation component 120 provides a means for mitigating adverse effects associated with a suspicious credential change. For example, the mitigation component 120 can report the detection, initiate further logging of actions of a credential administrator, or suspend credential administrator capabilities or privileges.

Figure 2:
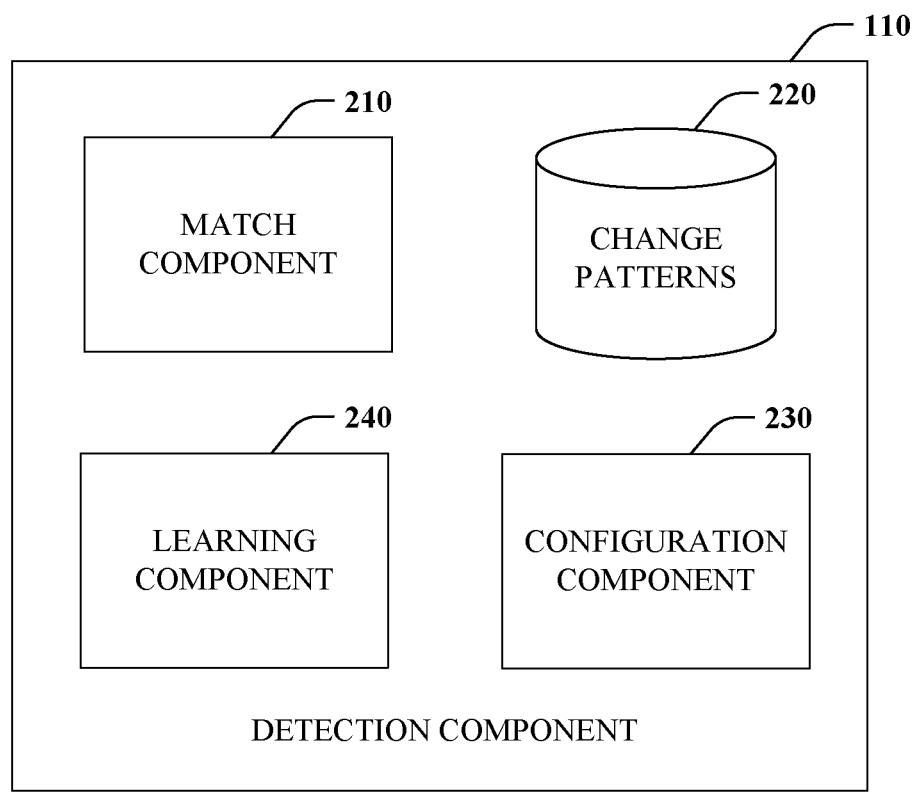
FIG. 2 is a schematic block diagram of a detection component.

Turning attention to FIG. 2, the detection component 110 is depicted in further detail. The detection component 110 includes match component 210, change patterns 220, configuration component 230, and learning component 240. The match component 210 seeks to detect suspicious credential changes using known suspicious change patterns 220. More specifically, the match component 210 can seek to match data received surrounding a credential change to a known suspicious change pattern. The change patterns 220 can be manually input utilizing the configuration component 230 or automatically specified by the learning component 240. The configuration component 230 provides a means for a user to specify suspicious change patterns and control when there is a match given the change patterns 220. For example, a user can specify the extent of pattern match (e.g., given percentage, features . . . ). Further, the configuration component 230 can enable setting of change pattern parameters, such as threshold times or number of identical credentials. The learning component 240 can take the known suspicious patterns and seek to learn new patterns or variations of existing patterns that can be used in matching. Various known and novel statistical analysis and artificial intelligence techniques can be employed by the learning component 240 to infer suspicious change patterns.

What follows are a few exemplary suspicious change patterns that can be encoded and utilized by the match component 210. Of course, other suspicious change patterns are possible that indicate statistically abnormal or suspicious actions. First, the change pattern can be circular on a given user account. For example, credential "A" is changed to credential "B" and then back to credential "A." This round trip exposes a user account to malicious activity and may be difficult for a user to detect. A second change pattern is a frequent credential change on the same account over a predetermined time. For instance, this pattern can be matched if a password, user name, or the like is changed more than once in two months on the same user account. A third pattern can involve an attempt to set a credential on an account that is not enabled for a credential. For example, a rogue credential administrator might attempt to configure their own phone number on an executive user's account to sign in to the account, but the executive has not enabled this sign-in method. A fourth pattern can be an attempt to set the same credential on more than one account in the same organization. For instance, this pattern is met if the same phone number or same password is configured on a predetermined number of accounts. A fifth pattern can be an attempt to set the same credential on more than one account in a different organization. Working two jobs is common and thus a user may have the same credentials. However, working five or more jobs is extremely unlikely and a sign of potential abuse. This pattern enables capture of abuse or malware at a platform level, as opposed to an abuse of a rogue agent inside an organization. A sixth pattern concerns an attempt to update a credential that is not verified or enabled by an end user. For example, a rogue administrator might set their own sign-in number on a victims account and then reset the sign-in number back to the original to hide their action. If a user does not validate the change of number, this could be deemed suspicious in accordance with the sixth pattern.

Figure 3:
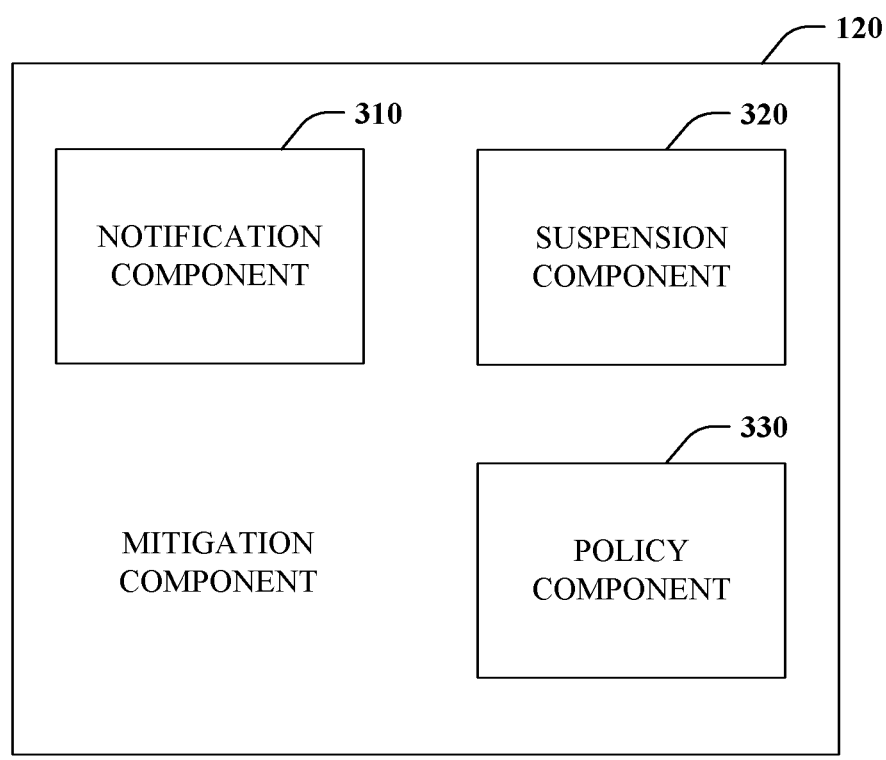
FIG. 3 is a schematic block diagram of a mitigation component.

Referring to FIG. 3, the mitigation component 120 is illustrated in further detail. As noted above, the mitigation component 120 mitigates adverse effects associated with a suspicious credential change. The mitigation component 120 includes notification component 310, suspension component 320, log component 330, and policy component 340. The notification component 310 is configured to provide notification to end-users as well as information technology administrators or others regarding a suspicious credential change. Notification can be provided by way of a variety of mediums including, among others, email and text message. The suspension component 320 enables a credential administrator role to be suspended without suspending a user account. In other words, if a credential administrator is associated with a suspicious credential change, a user account can still function, but management of credentials suspended. The log component 330 can be activated to perform additional logging associated with activities or a credential administrator to enable detailed analysis of credential administrator actions. The policy component 340 enables specification of a mitigation policy or set of policies. For example, a policy can indicate that upon detection of a suspicious credential change notification is to be provided and detailed logging enabled. Alternatively, a policy can indicate that the credential role is to be suspended immediately.

The notification component 310 can provide notification to end users, who can be potential victims. In one instance, when a user's credential is changed, the user can be notified. In accordance with one implementation, end users are first-line workers with a no password credential. More specifically, an end user can sign in with his/her phone number or email and receive a one-time code to their email or phone number. In this case, a notification can be sent to the old/previous phone number or email. For instance, when a sign-in phone number for an employee is changed, a text message can be sent to the new number and require employee action to enable this number as a sign in for their account. Further, a text message can be sent to the old number to inform the employee that the number can no longer be used as a sign-in for his/her account.

In addition to end users, the notification component 310 can enable notification to be provided to an information technology administrator, manager, fraud prevention service center, or other figure of authority. When a credential change is detected as suspicious, the user account that was used to make the change (presumably owned by a credential administrator), the authentication method used by this person, device information, network, location and timestamp can be logged. This logged information, or a subset thereof, can be presented to a figure of authority. In one implementation, a report can be generated and provided with a notification to the figure of authority.

In accordance with one embodiment, a notification can include a trigger for further action. In other words, instead of merely receiving a message that indicates there has been a suspicious credential change, and ability to take an action is provided. For example, a text message or email can include a link or button to suspend a credential authority's ability to manage credentials or initiate monitoring of the user account from which a suspicious credential change was performed.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ statistical analysis, artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the aforementioned techniques can be employed by one or both of the detection component 110 and the mitigation component 120 to infer suspicious credential change patterns and recommend a response based on detecting a suspicious credential change. More specifically, the detection component 110 can employ supervised or unsupervised learning with respect to classification of credential changes as suspicious or not. Further, patterns can be learned based on type of user, organization, or industry making changes. In this manner, a profile can be created regarding what to expect and anomaly detection can be performed based on what is expected.

In view of the exemplary systems described above, methods that may be implemented in accordance with the disclosed subject matter will be better appreciated with reference to the flow charts of FIG. 4-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
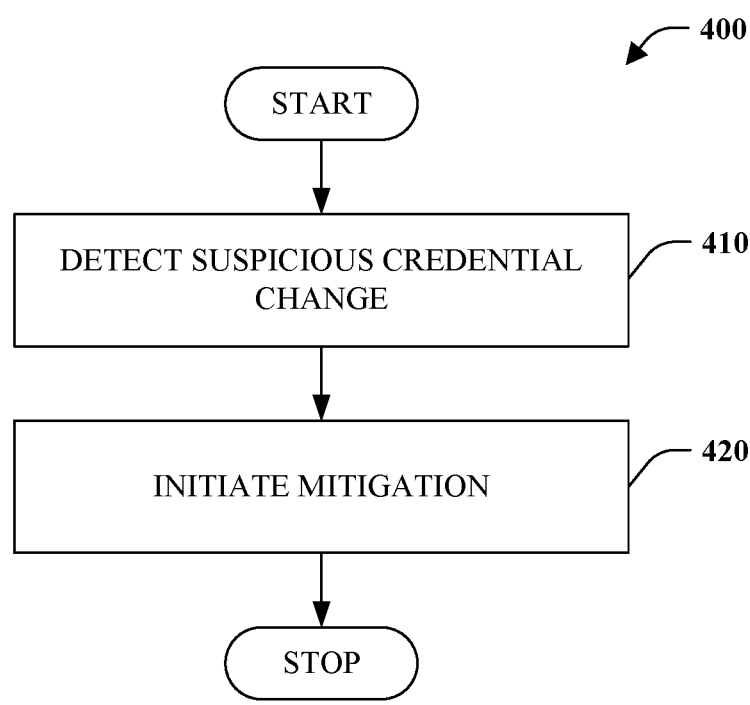
FIG. 4 is a flow chart diagram of a method of credential change management.

FIG. 4 illustrates a method 400 of credential change management. At reference numeral 410, a suspicious credential is automatically detected, inferred, or otherwise identified. After a credential change is made, by the credential administrator for example, information regarding the change can be analyzed to determine whether the change should be classified as suspicious or not. In accordance with one embodiment, information regarding a change can be compared with known patterns such that a match or similarity can be deemed a suspicious change. At reference numeral 410, mitigation is initiated to reduce the potential negative effects of a suspicious credential change. In accordance with one embodiment, notification can be sent to an end user whose account may have been compromised, a superior of a credential administrator (e.g., information technology administrator, fraud prevention department, manager . . . ), or both. In another embodiment, extensive monitoring of actions of a credential administrator associated with a suspicious change can be triggered. In yet another embodiment, credential management capability or role can be suspended, such that a user account with such privileges is no longer able to manage credentials. Still further yet, notifications can include a mechanism for triggering mitigation actions or a user policy can be specified and employed to automatically initiate mitigation actions.

Figure 5:
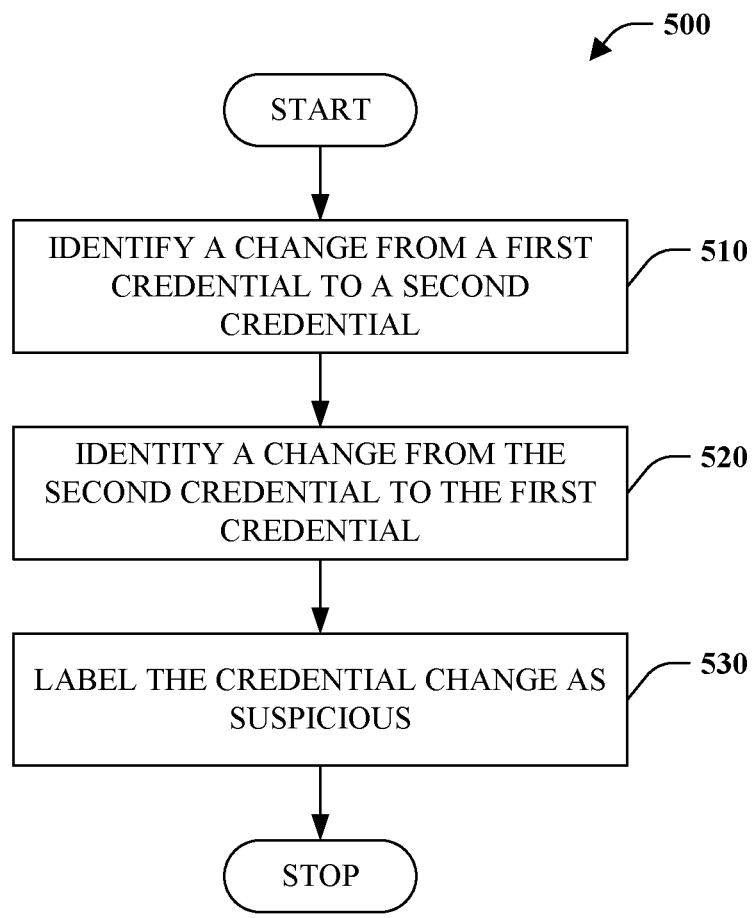
FIG. 5 is a flow chart diagram of a method of detecting suspicious credential change.

FIG. 5 depicts a method 500 of detecting a suspicious credential change. At reference numeral 510, a change from a first credential to a second credential is identified. For example, change of a password or change of a phone number, in a no-password system, can be detected. At reference numeral 520, a change from the second credential to the first credential is identified. For instance, a password could have been changed from "1234" to "5678" and back to "1234." The credential change is labeled or flagged as suspicious at reference numeral 530. This circular pattern is highly suspicious and difficult for a potential victim to detect.

Figure 6:
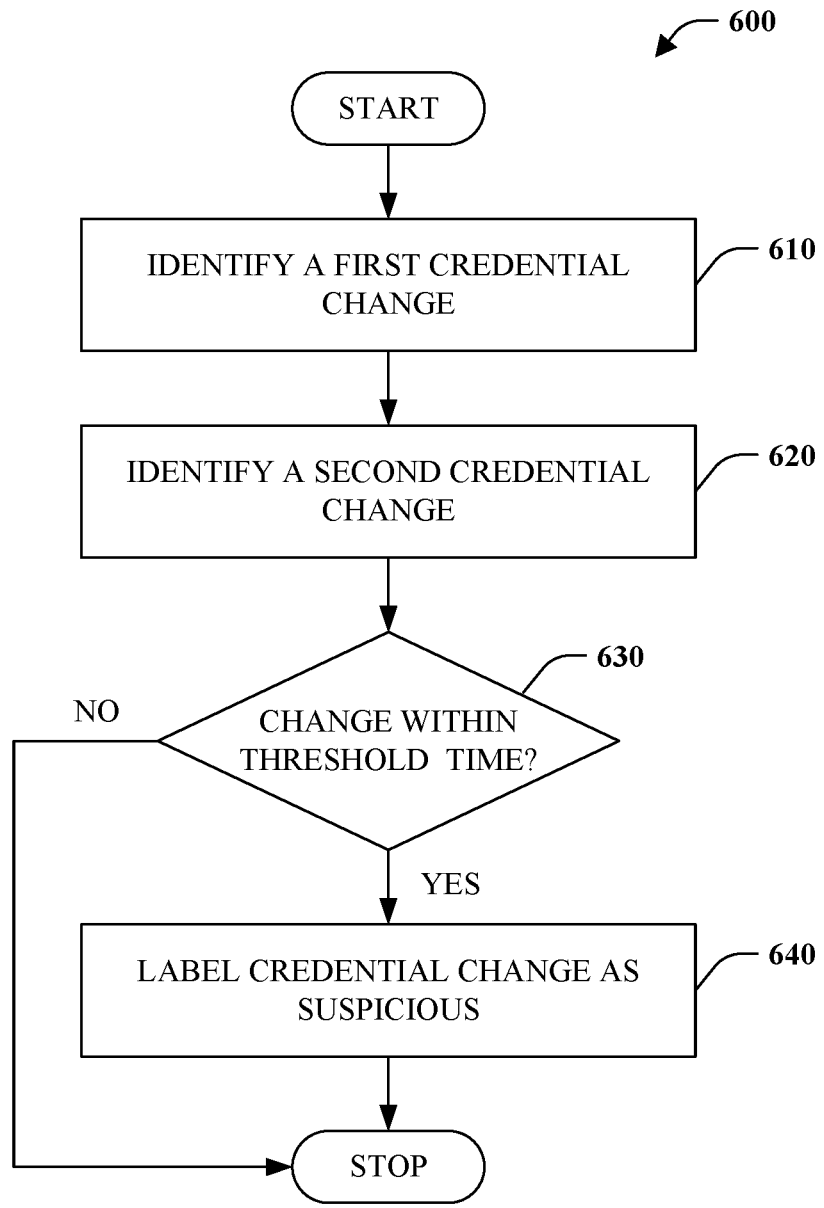
FIG. 6 is a flow chart diagram of a method of detecting suspicious credential change.

FIG. 6 is a flow chart diagram of a method 600 of detecting a suspicious credential change. At reference numeral 610, a first credential change is identified. At reference numeral 620, a second credential change is identified. In other words, the same credential has been changed twice. At numeral 630, a determination is made as to whether the change from a first credential to a second credential occurred within a threshold time. The threshold time is configurable. For example, the threshold time could be set for two months or two days. If the first credential change and the second credential change did not occur within the threshold time ("NO"), the method can simply terminate. If the first credential change and the second credential change did occur within the threshold time ("YES), the method continues at 640, where the credential change is labeled as suspicious. A relatively rapid change of credential can be suspicious. In accordance with one embodiment, the method 600 could also require a successful sign in with the first credential and then a change to the second credential to classify the change as suspicious.

Figure 7:
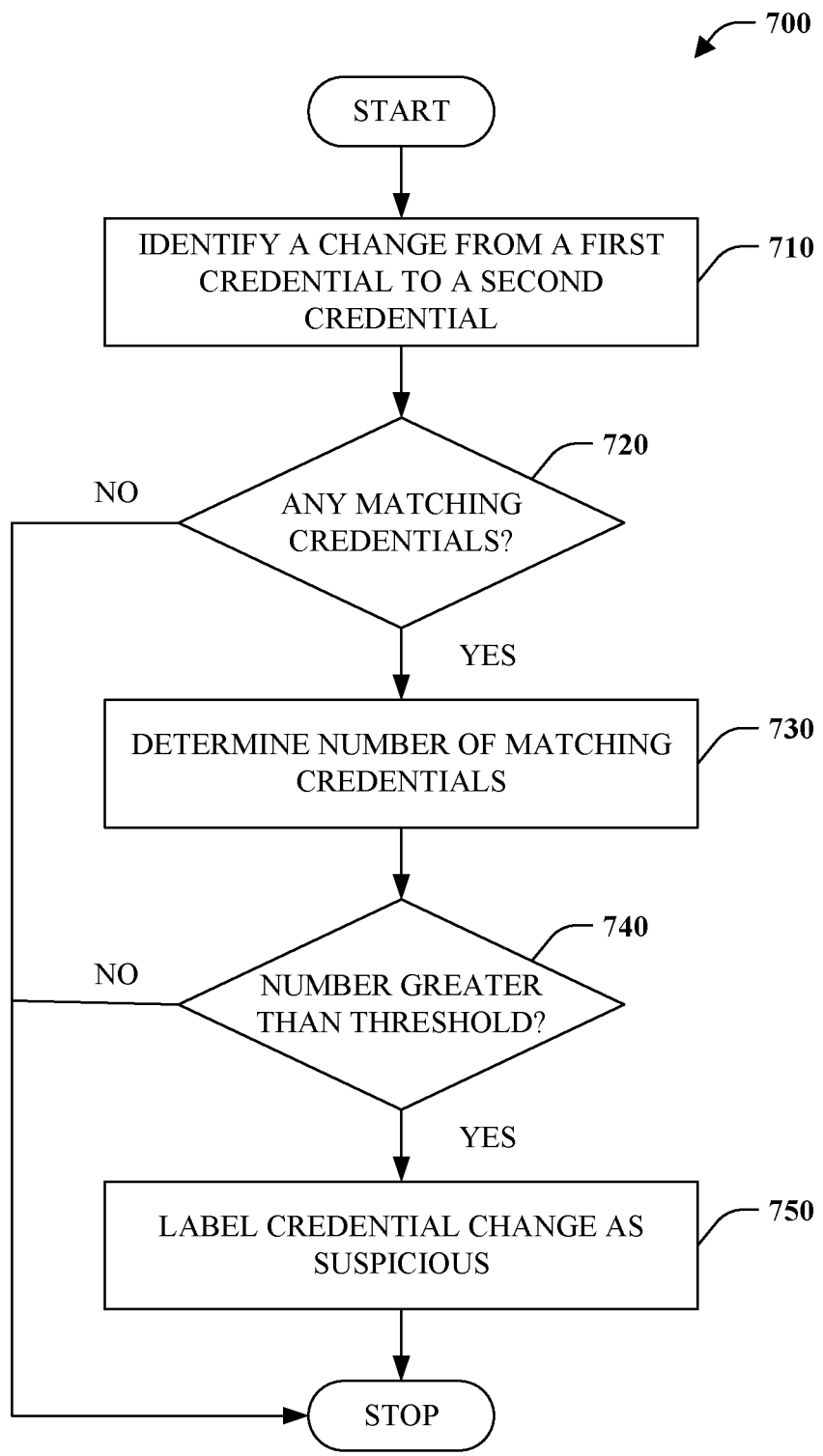
FIG. 7 is a flow chart diagram of a method of detecting suspicious credential change.

FIG. 7 illustrates a flow chart diagram of a method 700 of detecting a suspicious credential change. The method 700 as described below can be applied at an organizational level or across different organizations. At reference numeral 710, a change from a first credential to a second credential is identified. For example, a password can be changed from "1234" to "5678." At numeral 720, a determination is made as to whether there are any other credentials that match the second credential. In other words, are there any other passwords that are "5678?" If there are no matching credentials ("NO"), the method terminates. If there are matching credentials ("YES"), the method continues at 730. At reference numeral 730, the number of matching credentials is determined. Next, at 740, a determination is made as to whether or not the number of matching credentials is greater than a predetermined threshold. If the number of matching credentials is less than or equal to the threshold ("NO"), the method terminates. If the number of matching credentials is greater than the threshold ("YES"), the method continues at 750, where the credential change is labeled or flagged as suspicious. It is possible that a user has two jobs and uses the same username and/or password. Therefore, it may not be suspicious if the threshold number is two or less. However, if five accounts are set with the same username and/or password this is likely a sign of potential abuse or malware.

Figure 8:
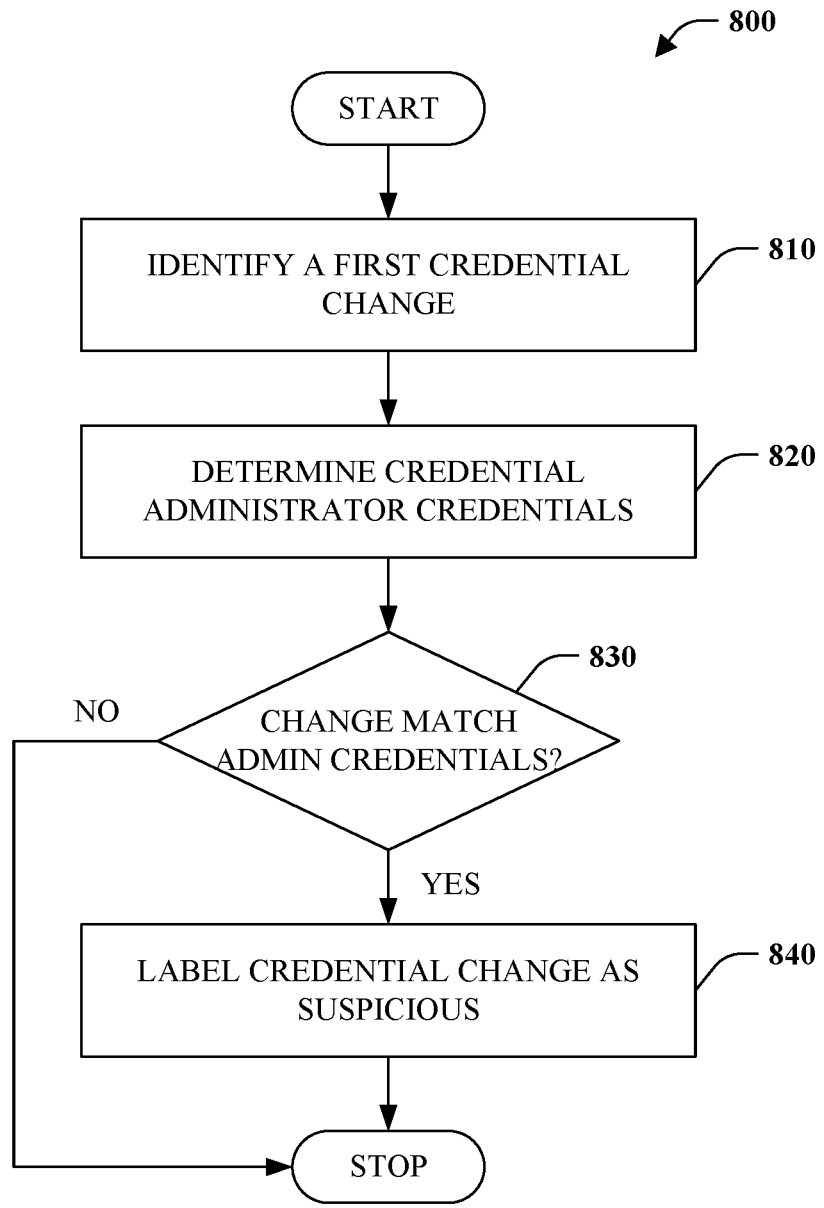
FIG. 8 is a flow chart diagram of a method of detecting suspicious credential change.

FIG. 8 is a flow chart depicting a method 800 of detecting a suspicious credential change. At reference numeral 810, a first credential change is identified. At numeral 820, credentials are determined for a credential administrator who made the credential change. A determination is made, at numeral 830, as to whether the change credential matches a credential of the credential administrator. If the change credential does not match a credential of the administrator ("NO"), the method terminates. If the change credential does match a credential of the administrator ("YES"), the method continues at 840, where the credential change is labeled as suspicious. In this manner, an administrator setting his own credential on another account can be deemed suspicious.

Figure 9:
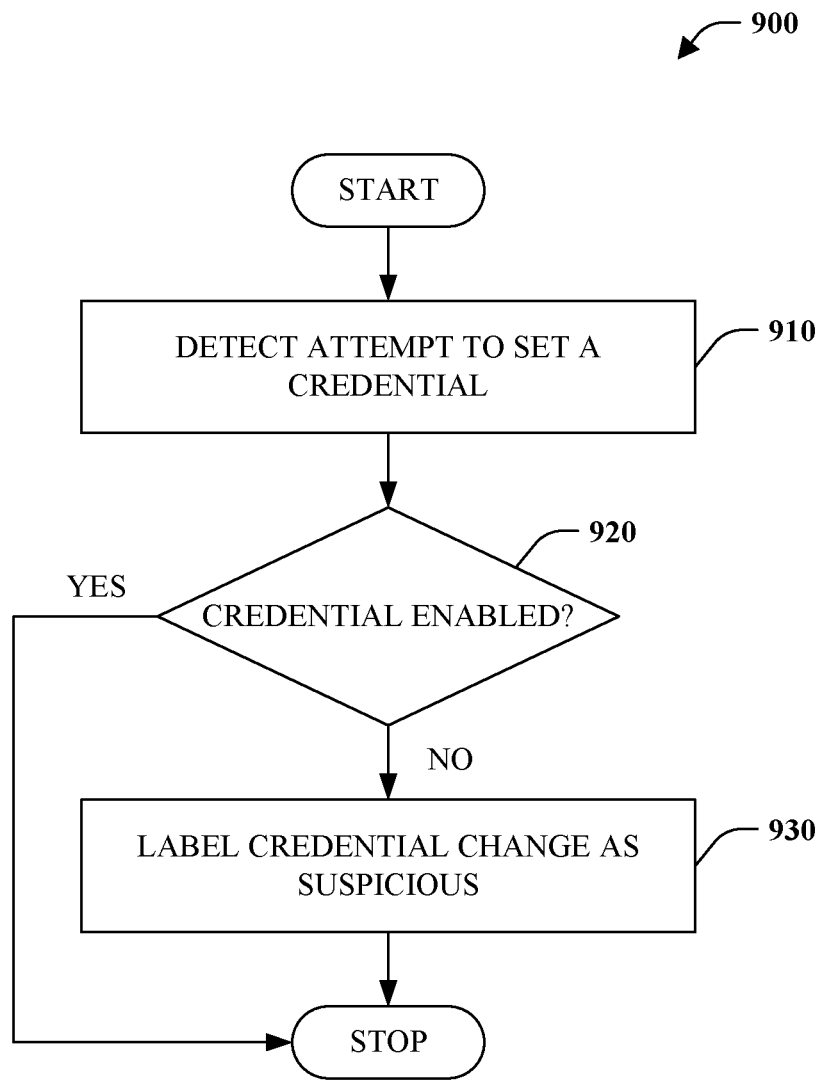
FIG. 9 is a flow chart diagram of a method of detecting suspicious credential change.

FIG. 9 is a flow chart diagram illustrating a method of detecting suspicious credential change. At reference numeral 910, an attempt to set a credential is detected. For instance, an attempt can be made to set a phone number as a credential on a user account. At numeral 920, a determination is made as to whether or not the type of credential attempting to be set is enabled on a target user account. In other words, the determination concerns whether a user account has been configured to accept a particular type of credential for authentication purposes. If the credential is enabled ("YES"), the method terminates. On the other hand, if the credential is not enabled for the user account ("NO"), the method continues at 930. At reference numeral 930, the potential credential change is labeled as suspicious. By way of example, a rogue credential administrator might attempt to configure their own phone number on an executive's user account to sign in to the account. However, the executive's account may not be enabled for this sign-in method, which would be suspicious.

Aspects of the subject disclosure pertain to the technical problem of credential security. Technical mechanisms are utilized to detect and mitigate suspicious credential changes. A credential change can be compared with known or learned suspicious change patterns to automatically detect or infer suspicious credential changes. Once detected, one or more mitigation strategies can be triggered based on the suspicious change. For example, notifications can be sent, monitoring of a user account initiated, or a credential management capability of a user account suspended.

The subject disclosure supports various products and processes that perform, or are configured to perform, various actions regarding suspicious credential change and mitigation. What follows are one or more exemplary systems and methods.

A system comprises: a processor coupled to a memory, the processor configured to execute computer-executable instructions stored in the memory that when executed cause the processor to perform the following actions: receiving data regarding a user credential change; detecting a suspicious credential change automatically based on the data and a set of one or more suspicious change patterns; and initiating mitigation of the suspicious credential change. In one first instance, the suspicious change pattern comprises a circular pattern in which a first credential is changed to a second credential and back to the first credential. In a second instance, the suspicious change pattern comprises multiple changes within a predetermined time. In a third instance, the suspicious change pattern comprises setting the same credential on more than one account. In a fourth instance, the suspicious change pattern comprises an attempt to set a credential on an account, wherein the account is disabled for the credential attempted to be set. In a fifth instance, the suspicious change pattern comprises an attempt to update a credential that is not validated by an end user. Mitigation further comprises suspending solely an ability of a credential administrator to manage credentials. Mitigation can further comprise generating a notification of the suspicious credential change with a trigger that when activated performs an action with respect to a credential administrator. The system further comprises performing automatic mitigation based on a configurable policy.

A method comprises: employing at least one processor configured to execute computer-executable instructions stored in a memory that when executed cause the at least one processor to perform the following acts: receiving data regarding a user credential change; detecting a suspicious credential change automatically based on the data and a set of one or more suspicious change patterns; and initiating mitigation of the suspicious credential change. The method further comprises detecting the suspicious credential change based on a suspicious change pattern specifying a circular pattern in which a first credential is changed to a second credential and back the first credential. The method further comprises detecting the suspicious credential change based on a suspicious change pattern specifying multiple changes within a predetermined time. The method further comprises detecting the suspicious credential change based on a suspicious change pattern specifying the same credential is set on multiple accounts. Initiating mitigation further comprises suspending solely credential management capabilities of a credential administrator account used to make the user credential change. In another instance, initiating mitigation further comprises generating a notification with a mechanism configured to trigger a particular mitigation activity. The method further comprises initiating mitigation automatically in response to a configurable mitigation policy.

A credential management method comprises: employing at least one processor configured to execute computer-executable instructions stored in a memory that when executed cause the at least one processor to perform the following acts: detecting a suspicious credential change automatically by comparing data associated with a credential change for a user account with a set of one or more suspicious change patterns, wherein a match between the data and one of the set of one or more suspicious change patterns indicates a suspicious credential change; and initiating automatic mitigation of the suspicious credential change after detection of the suspicious credential change. The method further comprises matching the data associated with the credential change to a suspicious change pattern comprising a circular pattern in which a first credential is changed to a second credential and back to the first credential. The method further comprises matching the data associated with the credential change to suspicious change pattern comprising multiple changes within a predetermined time. Automatic mitigation further comprises generating a notification with a mechanism to trigger one of suspending credential management privileges of a credential administrator responsible for making the credential change or turning on extensive logging of activities of the credential administrator.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
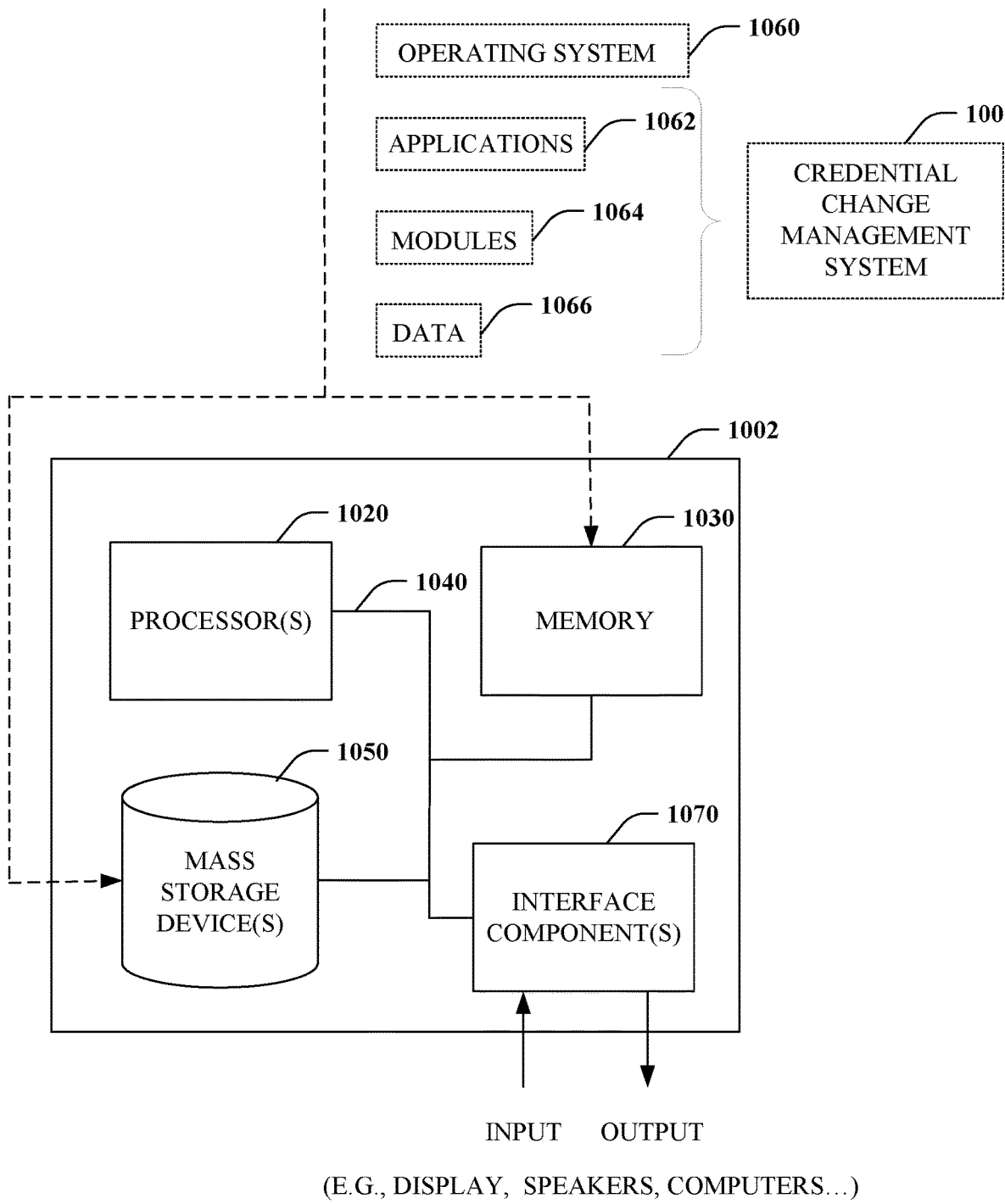
FIG. 10 is a schematic block diagram illustrating a suitable operating environment for aspects of the subject disclosure.

In order to provide a context for the disclosed subject matter, FIG. 10 as well as the following discussion are intended to provide a brief, general description of a suitable environment in which various aspects of the disclosed subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example general-purpose computer or computing device 1002 (e.g., desktop, laptop, tablet, watch, server, hand-held, programmable consumer or industrial electronics, set-top box, game system, compute node . . . ). The computer 1002 includes one or more processor(s) 1020, memory 1030, system bus 1040, mass storage device(s) 1050, and one or more interface components 1070. The system bus 1040 communicatively couples at least the above system constituents. However, it is to be appreciated that in its simplest form the computer 1002 can include one or more processors 1020 coupled to memory 1030 that execute various computer executable actions, instructions, and or components stored in memory 1030.

The processor(s) 1020 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1020 can be a graphics processor.

The computer 1002 can include or otherwise interact with a variety of computer-readable media to facilitate control of the computer 1002 to implement one or more aspects of the disclosed subject matter. The computer-readable media can be any available media that can be accessed by the computer 1002 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1002.

Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1030 and mass storage device(s) 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1002, such as during start-up, can be stored in nonvolatile memory, while volatile memory can act as external cache memory to facilitate processing by the processor(s) 1020, among other things.

Mass storage device(s) 1050 includes removable/non-removable, volatile/non-volatile computer storage media for storage of large amounts of data relative to the memory 1030. For example, mass storage device(s) 1050 includes, but is not limited to, one or more devices such as a magnetic or optical disk drive, floppy disk drive, flash memory, solid-state drive, or memory stick.

Memory 1030 and mass storage device(s) 1050 can include, or have stored therein, operating system 1060, one or more applications 1062, one or more program modules 1064, and data 1066. The operating system 1060 acts to control and allocate resources of the computer 1002. Applications 1062 include one or both of system and application software and can exploit management of resources by the operating system 1060 through program modules 1064 and data 1066 stored in memory 1030 and/or mass storage device(s) 1050 to perform one or more actions. Accordingly, applications 1062 can turn a general-purpose computer 1002 into a specialized machine in accordance with the logic provided thereby.

All or portions of the disclosed subject matter can be implemented using standard programming and/or engineering techniques to produce software, firmware, hardware, or any combination thereof to control a computer to realize the disclosed functionality. By way of example and not limitation, the credential change management system 100, or other portions thereof, can be, or form part, of an application 1062, and include one or more modules 1064 and data 1066 stored in memory and/or mass storage device(s) 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the credential change management system 100 and/or functionality associated therewith can be embedded within hardware in a SOC architecture.

The computer 1002 also includes one or more interface components 1070 that are communicatively coupled to the system bus 1040 and facilitate interaction with the computer 1002. By way of example, the interface component 1070 can be a port (e.g. serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 1002, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., LCD, LED, plasma, organic light-emitting diode display (OLED) . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
one or more processors; and
one or more computer-readable hardware storage devices that store instructions that are executable by the one or more processors to cause the system to at least:
receive data regarding a user credential change;
detect a suspicious credential change automatically based on the data and a set of one or more known suspicious change patterns, wherein an option is provided to a user to specify a minimum extent of pattern match that is to at least exist between the user credential change and at least one known suspicious change pattern included in the set of one or more known suspicious change patterns in order for that suspicious credential change to be detected based on the user credential change; and
initiate mitigation of the suspicious credential change, wherein mitigation of the suspicious credential change includes:
in response to determining a credential administrator account, which is initially provided with an ability to manage credentials, including changing credentials, is associated with the suspicious credential change, suspend only the ability of the credential administrator account to manage credentials while permitting user account functions associated with the credential administrator account to continue uninterrupted.

2. The system of claim 1, the suspicious change pattern comprises a circular pattern in which a first credential is changed to a second credential and back to the first credential.

3. The system of claim 1, the suspicious change pattern comprises multiple changes within a predetermined time.

4. The system of claim 1, the suspicious change pattern comprises setting the same credential on more than one account.

5. The system of claim 1, the suspicious change pattern comprises an attempt to set a credential on an account,
wherein the credential attempted to be set is forbidden on the account.

6. The system of claim 1, the suspicious change pattern comprises an attempt to update a credential that is not validated by the user.

7. The system of claim 1, the mitigation further comprising generating a notification of the suspicious credential change with a trigger that when activated performs an action with respect to a credential administrator.

8. The system of claim 1 further comprising performing automatic mitigation based on a configurable policy.

9. The system of claim 1, wherein the minimum extent of pattern match includes a percentage match requirement by which the user credential change matches at least one known suspicious change pattern included in the set of one or more known suspicious change patterns such that the option includes a particular option by which the user specifies the percentage match requirement.

10. A method comprising:
employing at least one processor configured to execute computer-executable instructions stored in a memory, the instructions, when executed by the at least one processor, cause the at least one processor to perform the following acts:
receive data regarding a user credential change;
detect a suspicious credential change automatically based on the data and a set of one or more known suspicious change patterns, wherein an option is provided to a user to specify a minimum extent of pattern match that is to at least exist between the user credential change and at least one known suspicious change pattern included in the set of one or more known suspicious change patterns in order for that suspicious credential change to be detected based on the user credential change; and
initiate mitigation of the suspicious credential change, wherein mitigation of the suspicious credential change includes:
in response to determining a credential administrator account, which is initially provided with an ability to manage credentials, including changing credentials, is associated with the suspicious credential change, suspend only the ability of the credential administrator account to manage credentials while permitting user account functions associated with the credential administrator account to continue uninterrupted.

11. The method of claim 10 further comprising detecting the suspicious credential change based on a suspicious change pattern specifying a circular pattern in which a first credential is changed to a second credential and back the first credential.

12. The method of claim 10 further comprising detecting the suspicious credential change based on a suspicious change pattern specifying multiple changes within a predetermined time.

13. The method of claim 10 further comprising detecting the suspicious credential change based on a suspicious change pattern specifying the same credential is set on multiple accounts.

14. The method of claim 10, initiating mitigation further comprising generating a notification with a mechanism configured to trigger a particular mitigation activity.

15. The method of claim 10 further comprising initiating mitigation automatically in response to a configurable mitigation policy.

16. A credential management method comprising:
employing at least one processor configured to execute computer-executable instructions stored in a memory, the instructions, when executed, cause the at least one processor to perform the following acts:
detecting a suspicious credential change automatically by comparing data associated with a credential change for a user account with a set of one or more known suspicious change patterns, wherein a match between the data and one of the set of one or more known suspicious change patterns indicates the suspicious credential change, wherein an option is provided to a user to specify a minimum extent of pattern match that is to at least exist between the credential change and at least one known suspicious change pattern included in the set of one or more known suspicious change patterns in order for that suspicious credential change to be detected based on the credential change; and
initiating automatic mitigation of the suspicious credential change after detection of the suspicious credential change, wherein automatic mitigation of the suspicious credential change includes:
in response to determining a credential administrator account, which is initially provided with an ability to manage credentials, including changing credentials, is associated with the suspicious credential change, suspend only the ability of the credential administrator account to manage credentials while permitting user account functions associated with the credential administrator account to continue uninterrupted.

17. The method of claim 16 further comprising matching the data associated with the credential change to a suspicious change pattern comprising a circular pattern in which a first credential is changed to a second credential and back to the first credential.

18. The method of claim 16 further comprising matching the data associated with the credential change to suspicious change pattern comprising multiple changes within a predetermined time.

19. The method of claim 16, the automatic mitigation comprising generating a notification with a mechanism to trigger one of suspending credential management privileges of a credential administrator responsible for making the credential change or turning on extensive logging of activities of the credential administrator.

* * * * *